US008593719B2

(12) United States Patent
Farrand et al.

(10) Patent No.: US 8,593,719 B2
(45) Date of Patent: Nov. 26, 2013

(54) PARTICLES FOR ELECTROPHORETIC DISPLAYS

(75) Inventors: Louise Diane Farrand, Blandford Forum (GB); Mark James, Romsey (GB); Matthias Koch, Wiesbaden (DE); Ashley Nathan Smith, Southampton (GB); Jonathan Henry Wilson, Southampton (GB); Mark John Goulding, Ringwood (GB); Daniel Walker, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/148,381

(22) PCT Filed: Jan. 29, 2010

(86) PCT No.: PCT/EP2010/000552
§ 371 (c)(1),
(2), (4) Date: Aug. 8, 2011

(87) PCT Pub. No.: WO2010/089060
PCT Pub. Date: Aug. 12, 2010

(65) Prior Publication Data
US 2011/0306742 A1     Dec. 15, 2011

(30) Foreign Application Priority Data

Feb. 9, 2009   (EP) ................................. 09001776

(51) Int. Cl.
*G02B 26/00* (2006.01)
*G09G 3/34* (2006.01)
*C08F 228/06* (2006.01)
*C08F 4/04* (2006.01)
*C07C 245/06* (2006.01)

(52) U.S. Cl.
USPC ........... 359/296; 345/107; 977/897; 524/547; 524/548; 524/55; 524/556; 524/558; 524/567

(58) Field of Classification Search
USPC ............... 526/257, 287, 311; 534/611, 730; 977/897; 359/296; 345/107; 524/547, 524/548, 555, 556, 558, 567
See application file for complete search history.

(56) References Cited

U.S. PATENT DOCUMENTS

| 4,613,559 | A | | 9/1986 | Ober et al. |
|---|---|---|---|---|
| 5,227,444 | A | | 7/1993 | Muller et al. |
| 5,380,362 | A | | 1/1995 | Schubert |
| 5,403,518 | A | | 4/1995 | Schubert |
| 5,607,864 | A | | 3/1997 | Ricchiero et al. |
| 5,663,024 | A | * | 9/1997 | Smith et al. ................. 430/97 |
| 5,716,855 | A | | 2/1998 | Lerner et al. |
| 5,783,614 | A | | 7/1998 | Chen et al. |
| 6,194,488 | B1 | | 2/2001 | Chen et al. |
| 6,372,838 | B1 | * | 4/2002 | Rao et al. ................. 524/462 |
| 6,384,124 | B1 | * | 5/2002 | Rao et al. ................. 524/462 |
| 6,509,125 | B1 | * | 1/2003 | Ito et al. ................. 430/7 |
| 6,822,782 | B2 | | 11/2004 | Honeyman et al. |
| 6,956,690 | B2 | | 10/2005 | Yu et al. |
| 7,038,655 | B2 | | 5/2006 | Herb et al. |
| 7,052,766 | B2 | | 5/2006 | Zang et al. |
| 7,100,162 | B2 | | 8/2006 | Green et al. |
| 7,170,670 | B2 | | 1/2007 | Webber |
| 7,226,550 | B2 | | 6/2007 | Hou et al. |
| 7,236,290 | B1 | | 6/2007 | Zhang et al. |
| 7,247,379 | B2 | | 7/2007 | Pullen et al. |
| 7,277,218 | B2 | | 10/2007 | Hwang et al. |
| 7,304,634 | B2 | | 12/2007 | Albert et al. |
| 2005/0267263 | A1 | | 12/2005 | Minami |
| 2007/0128352 | A1 | | 6/2007 | Honeyman et al. |
| 2007/0268244 | A1 | | 11/2007 | Chopra et al. |
| 2007/0297038 | A1 | | 12/2007 | Chopra et al. |
| 2008/0013156 | A1 | | 1/2008 | Whitesides et al. |
| 2009/0025601 | A1 | * | 1/2009 | Vasudevan et al. ........ 106/31.65 |
| 2011/0216392 | A1 | * | 9/2011 | Baisch et al. ................. 359/296 |

FOREIGN PATENT DOCUMENTS

| EP | 1 491 941 | 12/2004 |
|---|---|---|
| GB | 2 438 436 | 11/2007 |
| WO | WO-94 00797 | 1/1994 |
| WO | WO-99 10767 | 3/1999 |
| WO | WO-2005 017046 | 2/2005 |
| WO | WO-2006 126120 | 11/2006 |
| WO | WO-2007 048721 | 5/2007 |
| WO | WO-2008 003604 | 1/2008 |
| WO | WO-2008 003619 | 1/2008 |

OTHER PUBLICATIONS

STN Structure Search, Jul. 15, 2013.*
Ego, C. et al., "Attaching perylene dyes to polyfluorene: Three simple, efficient methods for facile color tuning of light-emitting polymers," J. Am. Chem. Soc., 2003, vol. 125, pp. 437-443.
Kawatsuki, N. et al., "New photocrosslinkable copolymers for non-linear optical applications," Makromol. Chem., Rapid Commun., 1993, vol. 14, pp. 625-632.

(Continued)

*Primary Examiner* — Vu A Nguyen
(74) *Attorney, Agent, or Firm* — Millen, White, Zelano & Branigan, P.C.

(57) ABSTRACT

This invention relates to colored polymer particles preferably with surface functionality for charge retention, a process for their preparation, the use of these particles for the preparation of an electrophoretic device, color electrophoretic displays comprising such particle, and new water-soluble dyes.

15 Claims, No Drawings

(56) References Cited

OTHER PUBLICATIONS

Kim, T. H. et al., "Preparation and Characterization of Colored Electronic Ink Nanoparticles by High Temperature-Assisted Dyeing for Electrophoretic Displays," Journal of Nanoscience and Nanotechnology, 2006, vol. 6, pp. 3450-3454.

Landfest, K. et al., "Polyreactions in Miniemulsions," Macromol. Rapid Commun., 2001, vol. 22, No. 12, pp. 896-936.

Li, N. et al., "Synthesis of third-prder nonlinear optical polyacrylates containing an azobenzene side chain via atom transfer radical polymerization," Dyes and Pigments, 2009, vol. 80, pp. 73-79.

Tse, A. S. et al., "Synthesis of Dyed Monodisperse Poly(methyl methacrylate) Colloids for the Preparation of Submicron Periodic Light-Absorbing Arrays," Macromolecules, 1995, vol. 28, pp. 6533-6538.

Xie, S. et al., "Recent Developments in Aromatic Azo Polymers Research," Chem. Mater., 1993, vol. 5, pp. 403-411.

* cited by examiner

PARTICLES FOR ELECTROPHORETIC DISPLAYS

This invention relates to coloured polymer particles, preferably with surface functionality for charge retention, a process for their preparation, the use of these particles for the preparation of an electrophoretic device, colour electrophoretic displays comprising such particles, and new water-soluble dyes.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which is a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white or light colour. However, the main disadvantage of state of the art EPDs is the lack of a bright full colour system.

The use of different coloured particles in a single pixel has been exemplified in recent patent literature (U.S. Pat. No. 7,304,634, GB 2 438 436, US 2007/0268244), but all of these approaches require the use of complex cell structures and drive schemes.

Special coloured particles for EPDs and processes for their preparation are disclosed in US 2007/0297038, US 2008/0013156, U.S. Pat. No. 6,822,782, WO 2007/048721, WO 2008/003619, WO 2008/003604, US 2005/0267263, WO 2006/126120, and J. Nanosci. Nanotechn. 2006, Vol. 6, No. 11, p. 3450-3454. Two particle system comprising inorganic and resin particles are also known (EP 1 491 941). These coloured particles are only achievable by complicated processes and/or they are only suitable for specific applications. Similar coloured particles and their preparation processes are known for analytical techniques (U.S. Pat. No. 5,607,864 and U.S. Pat. No. 5,716,855) and as toner particles for ink jet printing (U.S. Pat. No. 4,613,559).

There is a need for a simple preparation of charged coloured particles which can be easily dispersed in non-polar media, show electrophoretic mobility and which do not leach colour in a dispersant.

Therefore, the object of this invention is to provide electro-optically active media for colour electrophoretic displays and specifically engineered coloured particles for use in such media.

This object is solved by a process for the preparation of coloured polymer particles for use in electrophoretic devices comprising the steps of a) the reaction of at least one polymerisable dye, at least one monomer, at least one initiator, and optionally at least one charged co-monomer, and preferably b) washing and drying the coloured polymer particles, by these particles per se, by the use of these particles for the preparation of an electrophoretic device, by colour electrophoretic displays comprising such particles, and new water-soluble dyes.

The subject matter of this invention relates specifically to the use of specifically engineered polymer particles and their dispersion in dielectric organic media to produce a composition preferably suitable as the electrically switchable component of a full colour e-paper or electrophoretic display.

It relates more specifically to the synthesis of polymer particles, their surface modification with covalently bonded substituents to promote dispersability and the holding of a charge and to the physical and irreversible entrapment of a polymerisable dye to give colour to the particles.

It also relates specifically to dispersions of the afore-mentioned polymer particles in dielectric organic media, which enable electrophoretic switching of the particles in an applied electric field.

Advantages of the polymer particles according to the invention may be, in particular:
- excellent control of particle size, monodisperse size distribution with a small diameter range of 50-500 nm, preferably 150-400 nm, for image quality, and/or
- a glassy polymer nature for optical clarity and colour compatibility, and/or
- a homogeneous crosslinked network structure for solvent resistance, and/or
- a non-swelling nature when dispersed in EPD solvent media, impact strength, hardness, and/or
- dispersible in a non polar continuous phase that is the most used media for EPD, and/or
- high electrophoretic mobility in dielectric media, and/or
- technique is universally applicable for dye incorporation across all colours, and/or
- accurate zeta potential is possible, and/or
- all colours have same density (good for sedimentation/agglomeration performance), and/or
- excellent switching behaviour, faster response times at comparable voltages, and/or
- consistent surface properties, and/or
- good reproducibility, and/or
- densities close to that of the carrier fluid.

The main advantages of the present invention are that it is possible to prepare particles of appropriate colours e.g. red, green and blue or a combination of cyan, magenta and yellow, and to be able to prepare coloured particles of a desired size and which have a high mono-dispersity, and which preferably incorporate a charge, to enable electrophoretic movement.

It is especially advantageous that the present process is a one-step reaction to provide coloured particles suitable for EPD enabling a cost effective production process.

Use of a polymerisable dye in the formative stage of the particle, enables the dye to become irreversibly bound with the co-monomers and become an intrinsic part of the particle. Since the dye is covalently bound to the monomers in the particle, it is highly unlikely to leach into any solvent suitable for EPD.

In addition, the dye can be specifically designed to give a desired suitable colour, e.g. cyan or red. The polymerisable group on the dye can be easily modified (e.g. methacrylate, acrylate, etc.) so that an appropriate dye monomer can react with other monomers to form the particle. Another major advantage is that preferably an emulsion polymerisation in aqueous solution can be used. This route gives excellent control over monodispersity, particle size with a small diameter range of sub-micron size for image quality. Use of water as a solvent gives obvious safety and environmental advantages over use of organic solvents.

The present invention provides an easy way for the production of coloured polymeric particles, wherein charge and colour can be controlled independently from each other. It is especially advantageous that the inventive particles do not leach any colour into a non-polar solvent used as a carrier fluid in EPD even over a long time period.

In design and synthesis of particles for EPD, the present invention provides the opportunity to manipulate colour, charge, size, mono-dispersity etc. independently in order to produce particles with all the desired features for coloured EPD.

An essential component of the present invention is a polymerisable dye. In general the polymerisable dyes may be solvent soluble or water soluble and they may be anionic, cationic or neutral. Preferably water soluble dyes are used.

The function of the polymerisable dye is to colour the particle. The polymerisable dye consists of a chromophore, one or more polymerisable groups, optional linker groups (spacers), and optional groups to modify physical properties (like solubility, light fastness, etc.) and optionally charged group(s).

The polymerisable dye preferably comprises a chromophoric group and a functional group or plurality of functional groups selected from polymerisable groups e.g. methacrylates, acrylates, methacrylamides, acrylonitriles, α-substituted acrylates, styrenes and vinyl ethers, vinyl esters, propenyl ethers, oxetanes and epoxys etc., in particular methacrylates and acrylates. The polymerised group may be attached directly to the chromophoric group or may be attached through a linker group. An example of a suitable linker group is an optionally substituted alkyl chain, a polyether alkyl chain, a cycloalkyl or aromatic ring, heteroaromatic ring or a combination thereof.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferred chromophoric groups are azo groups (especially monoazo, and bisazo), anthraquinone and phthalocyanine groups.

Preferably the polymerisable dye comprises a chromophoric group and one or more functional groups selected from an acrylate or methacrylate backbone.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc). Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Modified polymerisable dyes (with reactive group(s)) from the application groups of reactive (anionic), direct (anionic), acidic (anionic) and basic (cationic) dyes as designated by the Colour Index (published by The Society of Dyers and Colourists with the American Association of Textile Chemists and Colorists e.g. $3^{rd}$ edition 1982) are preferred.

Preferable examples of polymerisable dyes are summarised in the following Tables:

TABLE 1

Examples of Solvent Soluble Reactive Dyes, Dye Examples 1-8 are commercially available from Sigma-Aldrich chemical company

| 1 | Disperse red 1 acrylate | 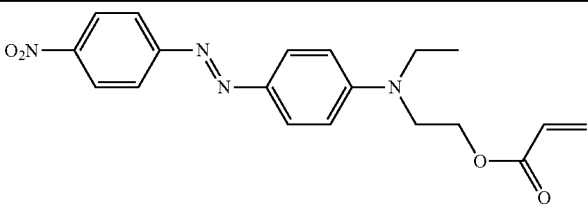 |
|---|---|---|
| 2 | Disperse Red 1 methacrylate | 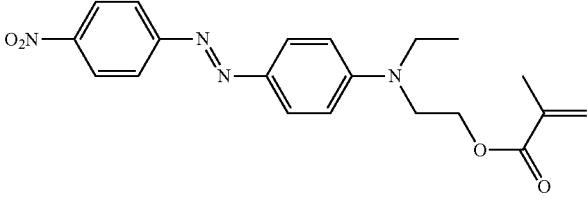 [SMILES: C=C(C)C(=O)OCCN(CC)c1ccc(/N=N/c2ccc([N+](=O)[O-])cc2)cc1] |
| 3 | Disperse Red 13 acrylate | 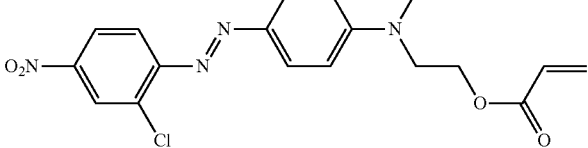 |

TABLE 1-continued
Examples of Solvent Soluble Reactive Dyes, Dye Examples 1-8
are commercially available from Sigma-Aldrich chemical company
4 Disperse Red 13 methacrylate 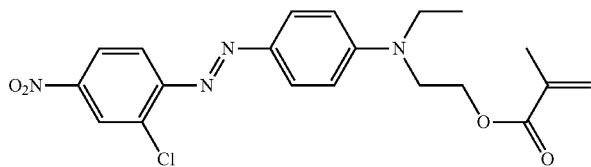
5 Disperse Yellow 7 methacrylate 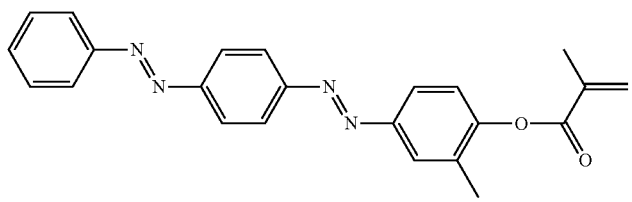 [SMILES: C=C(C)C(=O)Oc1ccc(/N=N/c2ccc(/N=N/c3ccccc3)cc2)cc1C]
6 Disperse Yellow 7 acrylate 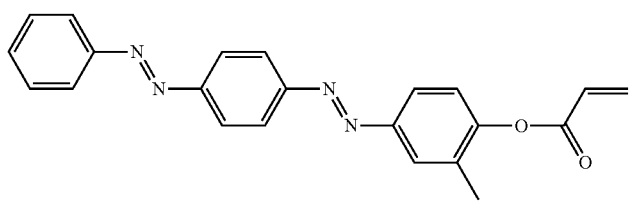 [SMILES: C=CC(=O)Oc1ccc(/N=N/c2ccc(/N=N/c3ccccc3)cc2)cc1C]
7 Disperse Orange 3 acrylamide 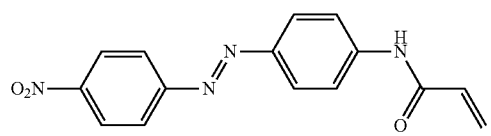 [SMILES: C=CC(=O)Nc1ccc(/N=N/c2ccc([N+](=O)[O-])cc2)cc1]
8 Disperse Orange 3 methacrylamide 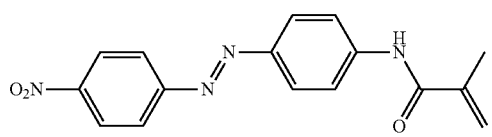 [SMILES: C=C(C)C(=O)Nc1ccc(/N=N/c2ccc([N+](=O)[O-])cc2)cc1]
9 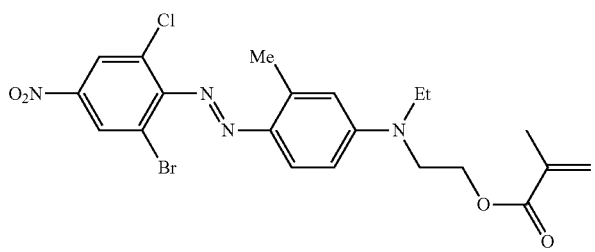 [SMILES: C=C(C)C(=O)OCCN(CC)c1ccc(/N=N/c2c(Cl)cc([N+](=O)[O-])cc2Br)c(C)c1]
10 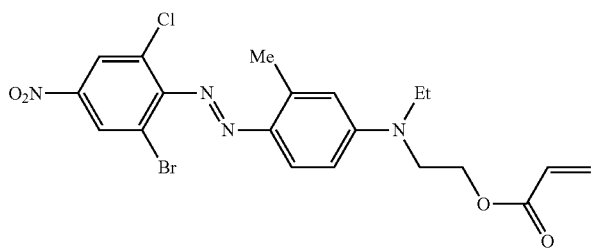 [SMILES: C=CC(=O)OCCN(CC)c1ccc(/N=N/c2c(Cl)cc([N+](=O)[O-])cc2Br)c(C)c1]

TABLE 1-continued
Examples of Solvent Soluble Reactive Dyes, Dye Examples 1-8
are commercially available from Sigma-Aldrich chemical company
11 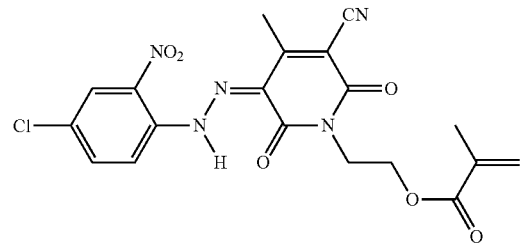 [SMILES: C=C(C)C(=O)OCCN1C(=O)C(C#N)=C(C)/C(=N/Nc2ccc(Cl)cc2[N+](=O)[O-])C1=O]
12 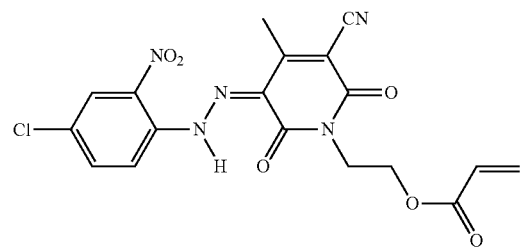 [SMILES: C=CC(=O)OCCN1C(=O)C(C#N)=C(C)/C(=N/Nc2ccc(Cl)cc2[N+](=O)[O-])C1=O]
13 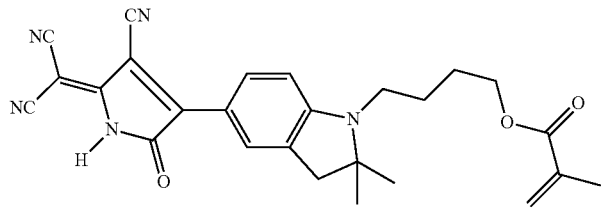 [SMILES: C=C(C)C(=O)OCCCCN1c2ccc(C3=C(C#N)C(=C(C#N)C#N)NC3=O)cc2CC1(C)C]
14 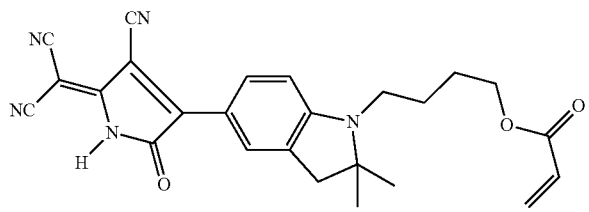 [SMILES: C=CC(=O)OCCCCN1c2ccc(C3=C(C#N)C(=C(C#N)C#N)NC3=O)cc2CC1(C)C]
15 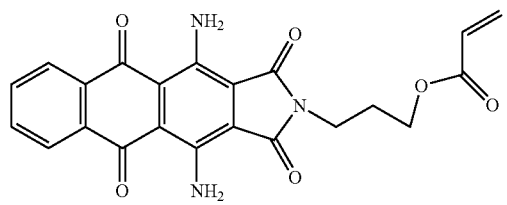 [SMILES: C=CC(=O)OCCCn1c(=O)c2c(N)c3c(=O)c4ccccc4c(=O)c3c(N)c2c1=O]
16 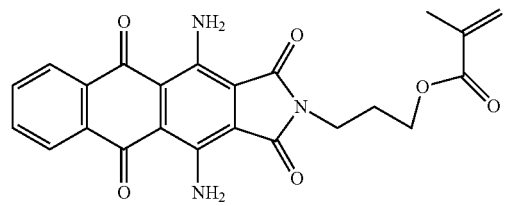 [SMILES: C=C(C)C(=O)OCCCn1c(=O)c2c(N)c3c(=O)c4ccccc4c(=O)c3c(N)c2c1=O]

TABLE 1-continued
Examples of Solvent Soluble Reactive Dyes, Dye Examples 1-8
are commercially available from Sigma-Aldrich chemical company
17 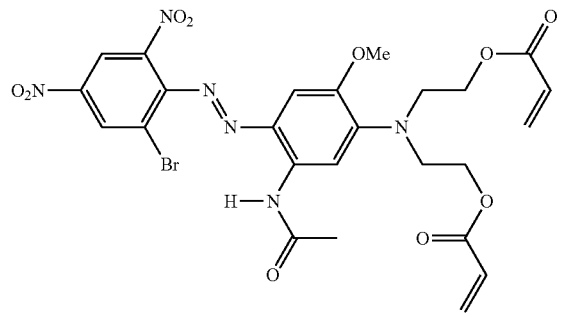 [SMILES: C=CC(=O)OCCN(CCOC(=O)C=C)c1cc(NC(C)=O)c(/N=N/c2c(Br)cc([N+](=O)[O-])cc2[N+](=O)[O-])cc1OC]
18 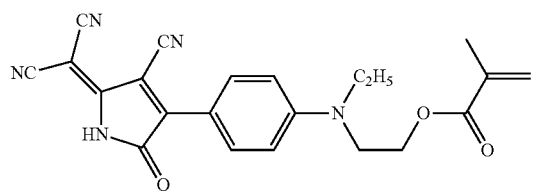 [SMILES: C=C(C)C(=O)OCCN(CC)c1ccc(C2=C(C#N)C(=C(C#N)C#N)NC2=O)cc1]
19 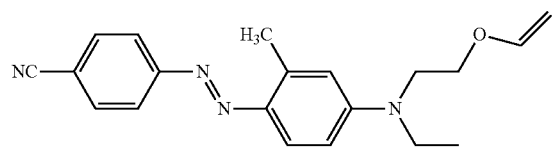 [SMILES: C=COCCN(CC)c1ccc(/N=N/c2ccc(C#N)cc2)c(C)c1]
20 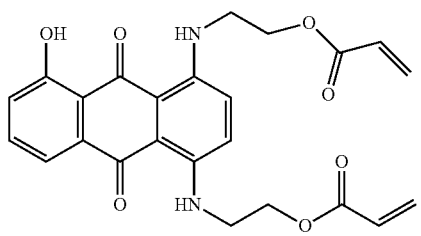 [SMILES: C=CC(=O)OCCNc1ccc(NCCOC(=O)C=C)c2c1C(=O)c1cccc(O)c1C2=O]
21 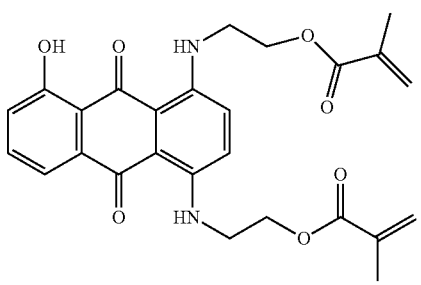 [SMILES: C=C(C)C(=O)OCCNc1ccc(NCCOC(=O)C(=C)C)c2c1C(=O)c1cccc(O)c1C2=O]
22 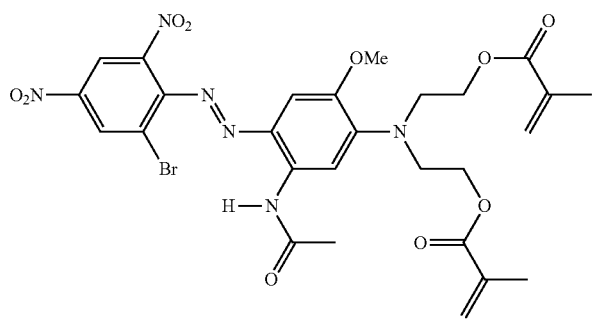 [SMILES: C=C(C)C(=O)OCCN(CCOC(=O)C(=C)C)c1cc(NC(C)=O)c(/N=N/c2c(Br)cc([N+](=O)[O-])cc2[N+](=O)[O-])cc1OC]

TABLE 1-continued

Examples of Solvent Soluble Reactive Dyes, Dye Examples 1-8 are commercially available from Sigma-Aldrich chemical company 23 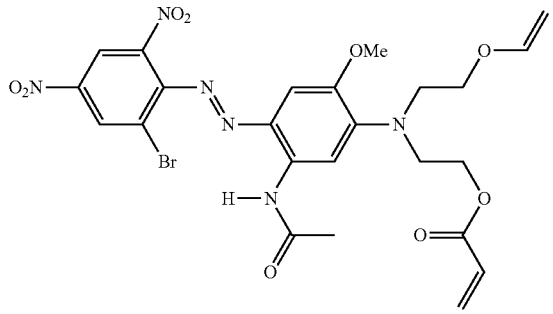 [SMILES: C=COCCN(CCOC(=O)C=C)c1cc(NC(C)=O)c(/N=N/c2c(Br)cc([N+](=O)[O-])cc2[N+](=O)[O-])cc1OC]

Cationic polymerisable dyes contain a covalently attached group or groups which have a positive charge in the application or contain a positive charge in the chromophore group. They can be derived from protonation or quaternation of nitrogen, phosphorous, oxygen or sulphur atoms or groups containing them, for example heteroaromatic (thiazole, imidazole) delocalised nitrogen bases (guanidine etc). Associated anions preferably have a single charge and can preferably be halogen, preferably F, Cl⁻, Br, monobasic acid (oxo) anions, preferably acetate, propionate, lactate, methane sulphonate, p-toluenesulphonate, hydroxide, nitrate).

Preferred examples of water soluble cationic polymerisable dyes are listed in Table 2 (counter ion $MeOSO_3$; also preferably suitable are Cl⁻, Br⁻, and acetate)

TABLE 2

1  Basic blue 41 methacrylate

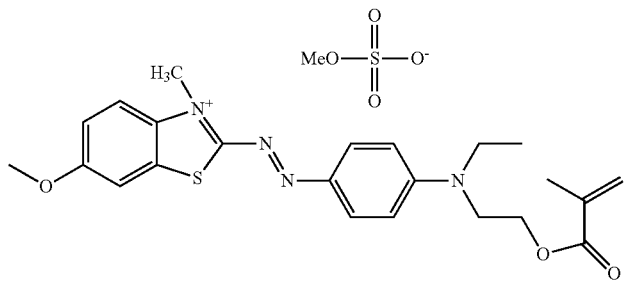 [SMILES: C=C(C)C(=O)OCCN(CC)c1ccc(/N=N/c2sc3cc(OC)ccc3[n+]2C)cc1 ; COS(=O)(=O)[O-]]

2

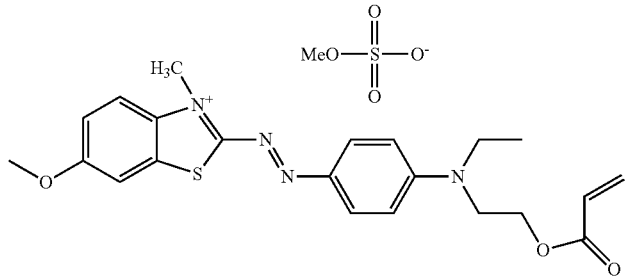 [SMILES: C=CC(=O)OCCN(CC)c1ccc(/N=N/c2sc3cc(OC)ccc3[n+]2C)cc1 ; COS(=O)(=O)[O-]]

3

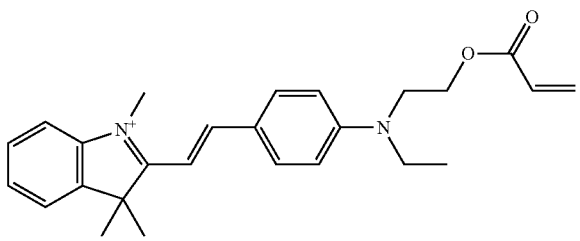 [SMILES: C=CC(=O)OCCN(CC)c1ccc(/C=C/C2=[N+](C)c3ccccc3C2(C)C)cc1]

TABLE 2-continued

4
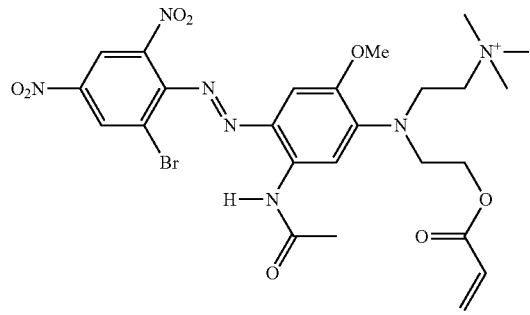 [SMILES: C=CC(=O)OCCN(CC[N+](C)(C)C)c1cc(NC(C)=O)c(/N=N/c2c(Br)cc([N+](=O)[O-])cc2[N+](=O)[O-])cc1OC]

Anionic polymerisable dyes contain a covalently attached group or groups which have a negative charge in the application and can be derived from deprotonation of an acidic group for example sulphonic, carboxylic, phosphonic acids. Associated cations preferably have a single charge and can be metallic ($Li^+$, $Na^+$, $K^+$ etc), charged nitrogen ($NH_4^+$, $NEt_3H^+$, $NEt_4^+$, $NMe_4^+$, imidazolium cation etc), positively charged phosphorous, sulphur etc. Preferred examples of water soluble anionic dyes are the $Na^+$, $NH_4^+$, $NEt_4^+$ salts of the acids.

Another preferred example is $CuPc(SO_3^-)_n (SO_2NHCH_2CH_2COOCMe{=\!=}CH_2)_m$ where CuPc is copper phthalocyanine and m>1, n>1, m+n>2 and <16 and preferably in the range of 2-5.

Preferred dye acids are listed in Table 3. Preferred water dispersible neutral dyes are listed in Table 4.

TABLE 3

1
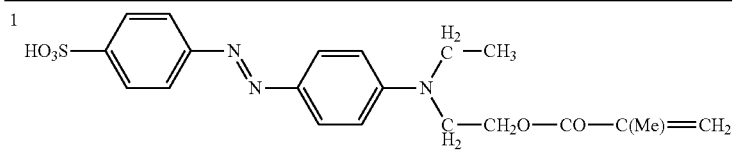

2
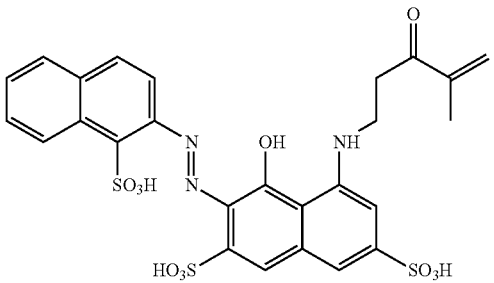 [SMILES: C=C(C)C(=O)CCNc1cc(S(=O)(=O)O)cc2cc(S(=O)(=O)O)c(/N=N/c3ccc4ccccc4c3S(=O)(=O)O)c(O)c12]

3
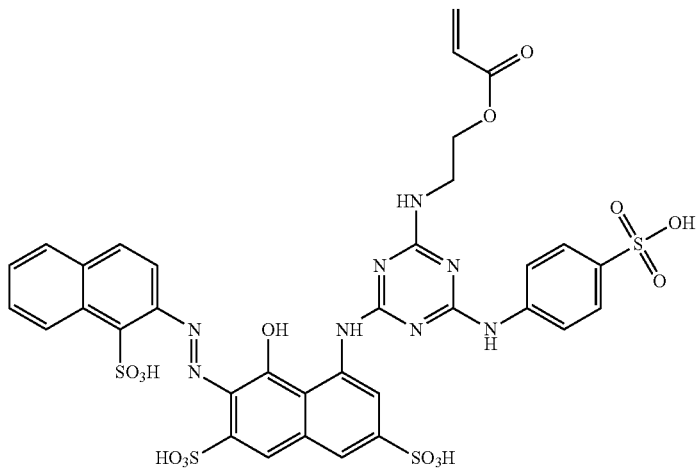 [SMILES: C=CC(=O)OCCNc1nc(Nc2ccc(S(=O)(=O)O)cc2)nc(Nc2cc(S(=O)(=O)O)cc3cc(S(=O)(=O)O)c(/N=N/c4ccc5ccccc5c4S(=O)(=O)O)c(O)c23)n1]

TABLE 4

1

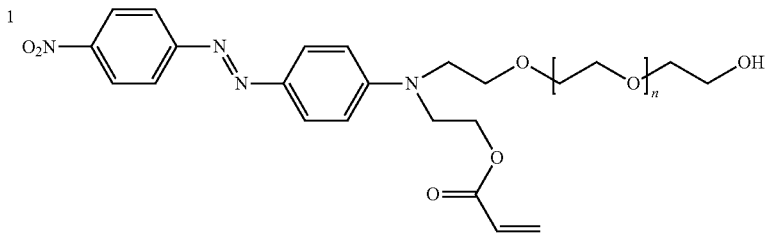

2

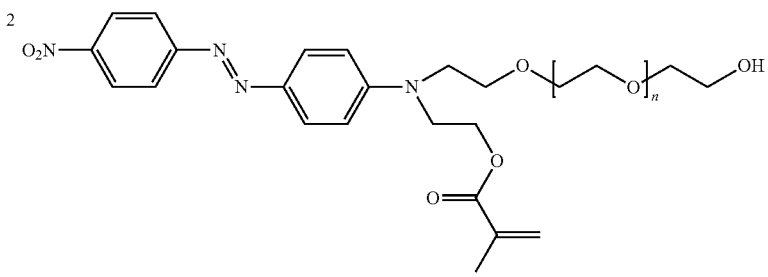

Preferably polymerisable water-soluble dye monomers such as the acrylate or methacrylate derivatives of cationic Basic Blue 41 (listed in Table 2 as numbers 1 and 2) and similar dyes, can be used.

Therefore, a further subject of the invention is a compound of Formula 1

Formula 1

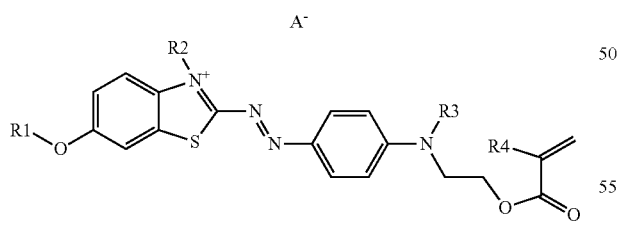

wherein R1, R2, R3=alkyl, preferably C1-C4 alkyl

R4=H or $CH_3$ $A^-$=halogen, monobasic acid (oxo) anions, preferably acetate, propionate, lactate, methane sulphonate, p-toluenesulphonate, hydroxide, or nitrate, preferably with R1, R2, R4=$CH_3$ and R3=$C_2H_5$ and $A^-$=methane sulfonate.

The preparation of such polymerisable dyes is exemplified for the methacrylate derivative of cationic Basic Blue 41 which can be prepared by a 3-step reaction as shown in the following scheme:

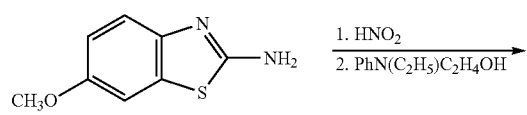

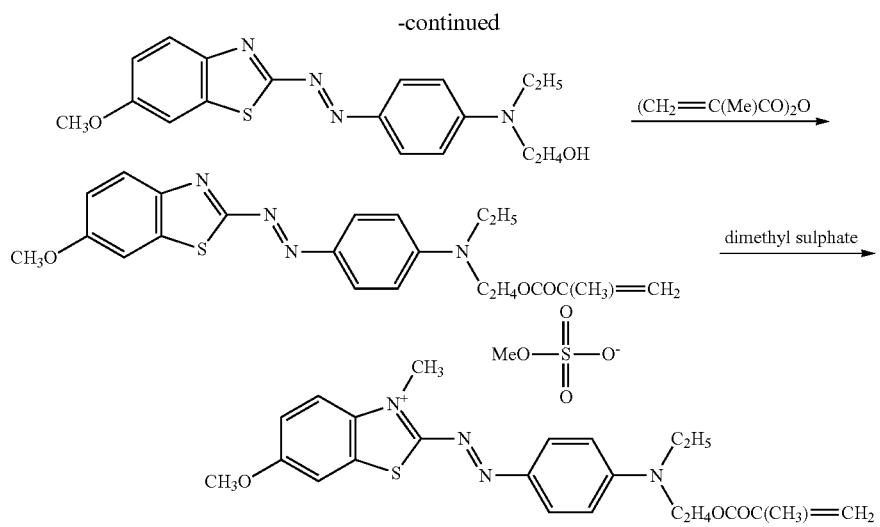

It is also possible to polymerise solvent soluble dyes such as commercially available Disperse Red 1 methacrylate.

Also preferred are dyes having a structure like dyes 11 or 12 of Table 1 or similar dyes as shown in Formula 2.

The preparation of such polymerisable dyes is exemplified for the methacrylate derivative (dye 11 of Table 1) which can be prepared by a 3-step reaction as shown in the following scheme:

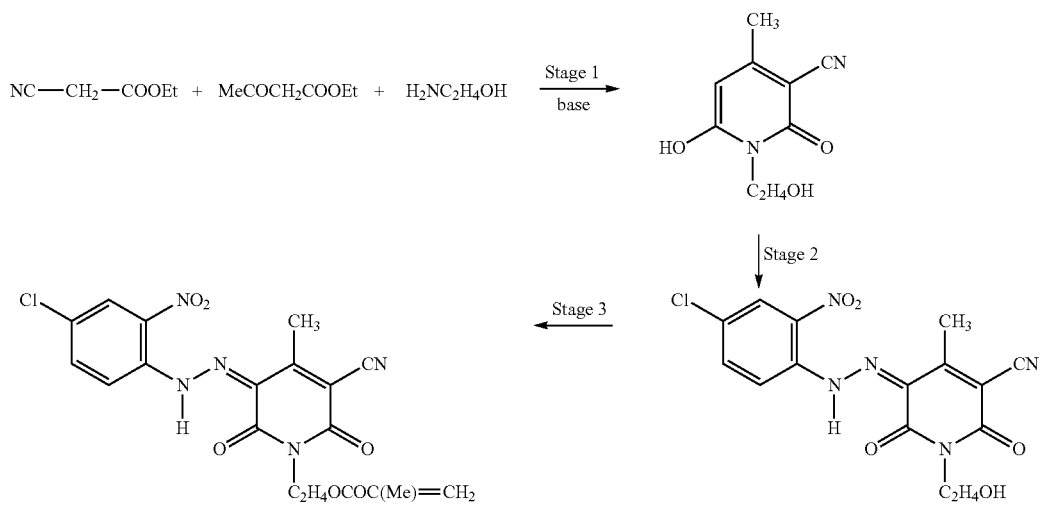

Formula 2

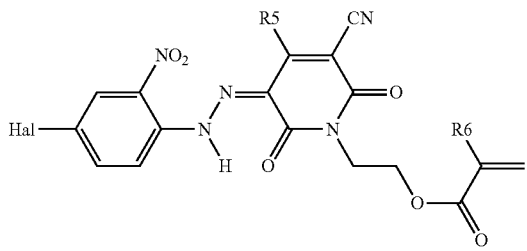

wherein
R5=alkyl, preferably C1-C4 alkyl, especially $CH_3$,
R6=H or $CH_3$, preferably $CH_3$,
Hal=halogen, preferably Cl.

It is also possible to polymerise dyes having a structure like dye 1 of Table 3 or similar dyes as shown in Formula 3.

Formula 3

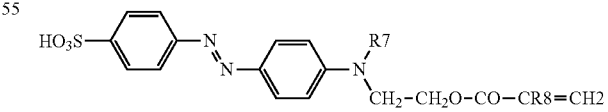

wherein R7=alkyl, preferably C1-C4 alkyl, especially $CH_3$,
R8=H or $CH_3$, preferably $CH_3$.

The preparation of such polymerisable dyes is exemplified for the methacrylate derivative (dye 1 of Table 3) which can be prepared by a 3-step reaction as shown in the following scheme:

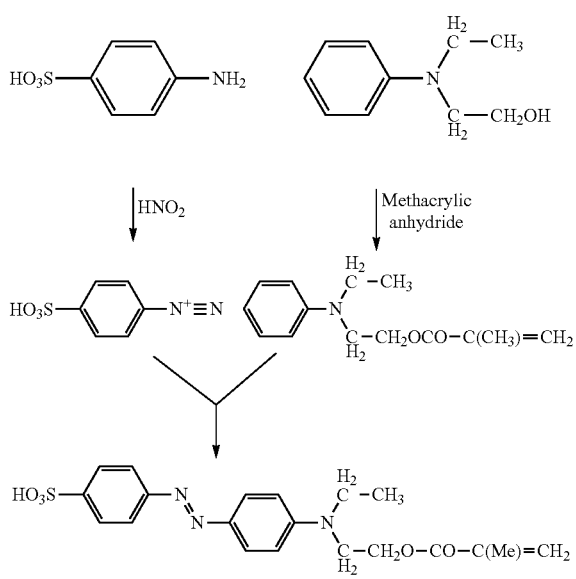

Preferably acrylate or methacrylate derivatives of Disperse red 1, dyes of Formula 1, especially methacrylate or acrylate derivative of cationic Basic Blue 41, dyes of Formula 2, especially with R5 and R6=CH$_3$ and Hal=Cl, and dyes of Formula 3, especially with R7 and R8=CH$_3$ are used as polymerisable dyes for the invention. Especially preferred are Disperse red 1 methacrylate, methacrylate derivative of cationic Basic Blue 41, and dye of Formula 2 with R5 and R6=CH$_3$ and Hal=Cl.

The cross-linked coloured polymer particles of the invention can be prepared in a simple 1-step reaction. The selection of the polymerisation conditions depends on the required size and size distribution of the particles. Adjustment of polymerization conditions is well known to someone skilled in the art.

The most appropriate method to synthesise uniform sub-micronic particles is by emulsion polymerisation. Emulsion polymerisation is a well known polymerisation process wherein barely water soluble monomers are emulsified in water by an emulsifier and polymerised by water-soluble initiators. Advantageously, the procedure by which an emulsion polymerisation is carried out has a profound effect upon the resulting particle size and polymer properties. Indeed, particles with quite different performance characteristics can be produced from the same reaction formulation by appropriate control of polymerisation process and conditions used. Comprehensive reviews of emulsion polymerisation conditions are given in "Emulsion polymerization"; van Herk, Alex; Gilbert, Bob; Department of Polymer Chemistry, Eindhoven University of Technology, Eindhoven, Neth. Editor(s): Van Herk.

Preferably, a batch emulsion polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch emulsion polymerisation process is used for manufacture versus a semi-continuous batch process because of limited versatility and simple evaluations of reaction formulation.

To meet the required characteristics of the particles for EPD, a surfactant-free emulsion copolymerisation using batch process is preferred. Protective colloids (water-soluble polymers) and surfactants are usually key formulation variables in emulsion polymerisation because of their impact on the intraparticle stability and particle size control but they may have a detrimental effect on the electrophoretic response. Preferably water soluble dyes are used in emulsion polymerisation. A preferred way of incorporating water-insoluble dyes into particles is to use the so-called 'mini-emulsion polymerisation', as described in K. Landfester, Macromol. Rapid. Commun., 2001, 22, 896-936.

A Mini-Emulsion Polymerisation (MEP) forms small stable droplets by high shear (30-500 nm) in a system containing a dispersed phase, a continuous phase, a surfactant and an osmotic pressure agent (hydrophobe). The nano sized droplets formed by high shear mixing are considered to be individual nanoreactors. It is these droplets which are the primary location for initiation of polymerisation. It is due to an inability of the water-insoluble dyes to be transported through the water medium that allows incorporation of these severely hydrophobic components in the droplets, and hence the forming of particles. Stabilisation against coalescence is achieved by adding surfactant whereas stabilisation against diffusion is achieved by adding a highly monomer soluble and water insoluble agent. The aim is to initiate polymerisation in each of the stabilised droplets. High shear can be achieved using a rotor-stator or high pressure homogenisers to prepare mechanical emulsification or ultrasound.

Preferably the polymerisation according to the invention is a free radical polymerisation.

Usually, a monomer composition according to the invention comprises at least one polymerisable dye, at least one monomer, at least one initiator, and optionally at least one charged co-monomer.

Preferably, a monomer composition according to the invention comprises polymerisable dye, a monomer providing the basic structure, a crosslinking co-monomer, an ionic co-monomer and an initiator.

The monomers described in the following for preparation of the polymeric particles can also be combined with the polymerisable dyes to produce a polymerisable dye-monomer mixture to be added to and/or incorporated in to the particles, for example as a core-shell effect so that there is more dye on the shell of the particles. Addition of a co-monomer seems advantageous in that it increases the amount of reactive groups available for polymerisation, the polymerisation proceeds faster with additional monomer. Particularly preferable are monomers which are similar to the particle make up, such as disperse red 1 acrylate with methyl methacrylate.

The monomers (and co-monomers) described in the following for preparation of the polymeric particles can be combined with the polymerisable dyes to produce a polymerisable dye/monomer mixture and/or the monomers can be incorporated stepwise into the polymerisable mixture to produce special effects, for example a core-shell effect so that there is more dye on the shell of the particles. Particularly preferable are monomers which are similar to the polymerisable dye, such as methyl methacrylate with disperse red 1 acrylate.

The particles can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer).

Especially preferred are methyl methacrylate and ethylene glycol dimethyl methacrylate as a cross-linker and 2-methacryloxy ethyl trimethyl ammonium chloride (MOTAC) as reactive charged monomer but many others could be used, the following are all examples of which could be used which are commercially available from the Sigma-Aldrich chemical company.

Methacrylates:

Methacrylic acid, Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol)methyl ether methacrylate, 2-(Dimethylamino) ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy)ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate. Preferably Methyl methacrylate (MMA), Ethyl methacrylate (EMA), Methacrylic acid, and/or n-Butyl methacrylate (BMA) are used.

Acrylates:

Acrylic acid, 4-Acryloylmorpholine, [2-(Acryloyloxy) ethyl]trimethylammonium chloride, acrylic acid, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol)ethyl ether acrylate technical grade, Di(ethylene glycol)2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol)methyl ether acrylate, Poly (propylene glycol)acrylate, Poly(propylene glycol)methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, Ethyl acrylate, Acrylic acid, and/or n-Butyl acrylate are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl) methyl]acrylamide, Styrenes Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol)methyl ether acrylate, Poly(ethylene glycol)phenyl ether acrylate, lauryl methacrylate, Poly(ethylene glycol)methyl ether acrylate, Poly(propylene glycol)methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis [4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene)biscarbamate, Bis[4-(vinyloxy)butyl]succinate, Bis[4-(vinyloxy) butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol)divinyl ether, Di(ethylene glycol)vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis [6-(acryloyloxy)hexanoate], Neopentyl glycol diacrylate, Pentaerythritol diacrylate, Pentaerythritol tetraacrylate, Pentaerythritol triacrylate, Poly(propylene glycol)diacrylate, Poly(propylene glycol)dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl]isocyanurate, Tri(propylene glycol)diacrylate.

Optionally, the monomer composition comprises at least one charged co-monomer. Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC), acryloxy ethyl trimethyl ammonium chloride (AOTAC) and [2-(Methacryloyloxy)ethyl]trimethylammonium methyl sulfate solution are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly(acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl) Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid)hydrochloride, 2,2'-(1,3-Phenylene)Bis(3-(2-Nitrophenyl)Acrylic Acid), 242-(2',4'-Difluoro[1,1'-Biphenyl]-4-Yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl) Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid.

A preferred monomer composition comprises methyl methacrylate and ethylene glycol dimethacrylate as a cross-linker and 2-methacryloxy ethyl trimethyl ammonium chloride (MOTAC) as reactive charged monomer.

Preferably, a water soluble initiator is used in the surfactant-free emulsion copolymerisation in order to control size, particle morphology and to reduce the residual monomers at the end of the reaction. Examples are azo compounds or peroxide compounds, hydroperoxides or peracid esters. Preferably azo compounds are used, especially azobis(isobutylamidine) hydrochloride (AIBA) and similar compounds.

The polymerisable composition of the invention usually comprises up to 10%, preferably 0.005-10%, especially 0.05-5% by weight of dye, 50-95%, preferably 70-90%, by weight of monomer, 1-40%, preferably 1-10%, by weight of crosslinking monomer, 1-30%, preferably 1-10%, by weight of ionic monomer and 0.1-10%, preferably 0.1-5%, by weight of initiator, all percentages are based on the total weight of the polymerisable composition (except solvent).

Cross-linked copolymer nanoparticles can be prepared by emulsifier-free copolymerization of methyl methacrylate (MMA), ethylene glycol dimethacrylate (EGDMA), and a cationic comonomer, methacryloxy ethyl trimethyl ammonium chloride (MOTAC) using azobis(isobutylamidine) hydrochloride (AIBA) as an initiator. Preferably, emulsifier-free emulsion polymerizations are conducted using a batch process, Polymer particles prepared according to the invention are preferably spherical particles with a size (diameter) in the range of 50-1000 nm and preferably with a monodisperse size distribution. Preferred particle sizes are 50-600 nm, preferably 50-560 nm, especially 50-500 nm, even more preferred 100-400 nm. Especially preferred are particles having a particle size of 150-400 nm, especially 150-350 nm. Particle sizes are determined by photon correlation spectroscopy of aqueous particle dispersions by a common apparatus such as a Malvern NanoZS particle analyser.

The size of polymer particles in electrophoretic fluids may be different from sizes measured in aqueous dispersions because of the influence of solvents and/or surfactants. In electrophoretic fluids, the polymer particles of the invention preferably have a particle size of 100-800 nm, especially 100-700 nm, preferably 150-700 nm are preferred. Especially preferred are polymer particles having a particle size of 150-600 nm.

Particles of the invention are primarily designed for use in electrophoretic displays. So, further subjects of the invention are electrophoretic fluids and electrophoretic displays comprising A typical electrophoretic display preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

Typical additives to improve the stability of the electrophoretic fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trot (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic nanoparticle such as titania, alumina or barium sulphate, coated with a surface layer to promote good dispersibility in dielectric media and a dielectric fluid media. The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046) The Electrophoretic fluid is then incorporated into an Electrophoretic display element by a variety of pixel architectures, such as can be found in C. M. Lampert, Displays; 2004, 25(5) published by Elsevier B.V., Amsterdam.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Apart from the preferred compounds mentioned in the description, the use thereof, compositions and processes, the claims disclose further preferred combinations of the subject-matters according to the invention.

The disclosures in the cited references are thus expressly also part of the disclosure content of the present application.

The following examples explain the present invention in greater detail without restricting the scope of protection. In particular, the features, properties and advantages, described in the examples, of the compounds on which the relevant examples are based can also be applied to other substances and compounds which are not described in detail, but fall within the scope of protection, unless stated otherwise elsewhere. In addition, the invention can be carried out throughout the range claimed and is not restricted to the examples mentioned here.

EXAMPLES

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Preparation of Methacrylate Ester Derivative of Cl Basic Blue 41

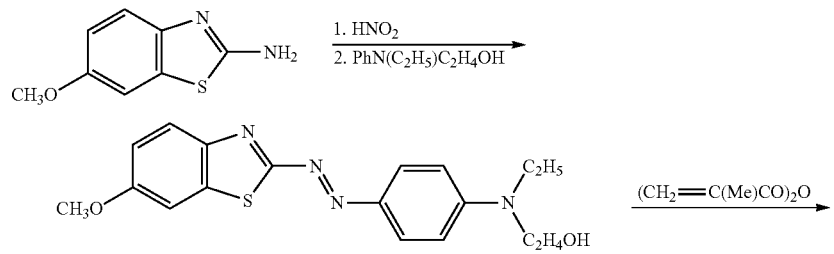

-continued

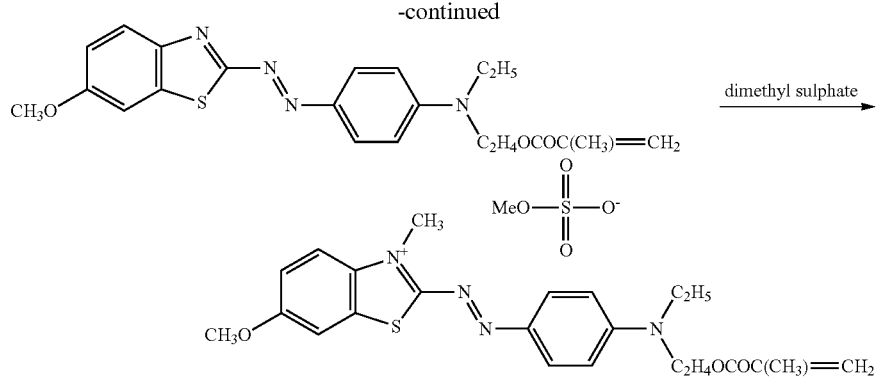

Stage 1

2-Amino-6-methoxybenzothiazole (18.0 g) is stirred in a mixture of acetic acid (70 ml) and propionic acid (50 ml) at 50° C. The resulting solution is cooled to −10° C. Nitrosylsulphuric acid solution (40 weight-% in sulphuric acid) (32.0 g) is added dropwise. This mixture is added to a stirred solution of N-ethyl-N-(2-hydroxyethyl) aniline and sulphamic acid (1.0 g) in acetic acid (25 ml) and ice/water (100 ml). After 20 minutes, the pH is raised to 4 by the dropwise addition of potassium hydroxide solution. A tarry residue is formed; the mixture is stirred for a further 2 hours until the tar solidifies. This solid is collected, washed with water and then dissolved in alcohol and acetone to give a deep red solution. Hot water is added to precipitate a solid which is removed by filtration. The solid is washed with cold alcohol and dried (29.5 g, 83% yield) Mp 178-179° C.

Stage 2

The above hydroxyethyl disperse dye (10.7 g) dye is stirred in methylene chloride (100 ml) and pyridine (20 ml). Methacrylic anhydride (10 ml) is added and the mixture is heated under reflux for 24 hours. On cooling to room temperature, water (5 ml) is added and the mixture is stirred for 2 hours. A volatile material is removed under reduced pressure, to leave a tarry residue which is stirred in 5 weight-% aqueous sodium bicarbonate solution for 16 hours. The resulting crude product is dissolved in methylene chloride/hexane (60/40) and passed through silica gel. After removal of solvent the solid residue (9.7 g) is crystallised from propan-2-ol to yield a rubine crystalline solid.

Yield 7.0 g, 55%. mp 123-125° C.

Stage 3

Dimethyl sulphate (1 ml) is added dropwise to a stirred solution of the methacrylate ester (1.06 g) in toluene (25 ml) at 100° C. After 10 minutes a tar begins to deposit on the walls of the flask and the mixture is allowed to cool to room temperature. The tar is washed with cold toluene and is stirred overnight in ethyl acetate (25 ml). The resulting semi-solid residue is collected, added to propan-2-ol and the mixture is heated to boiling. On cooling a solid is deposited which is washed with cold propan-2-ol and dried.

Yield 1.22 g, 89%. Mp 140-142° C. (97.3% main component by hplc) C23H27N4OS gives a mass ion of 439.

A mass spectrum of the sample gave a spectrum in positive ion mode. (EI+)

The spectra show ions at m/z 439 which corresponds with the cation for the proposed structure.

Example 2

Preparation of Blue Polymethyl Methacrylate (PMMA) Particles Containing Methacrylate Derived from Basic Blue 41

Methyl methacrylate (95.0 g), ethylene glycol dimethacrylate (8.0 g), [2-(methacryloyloxy)ethyl]-trimethyl ammonium chloride solution (75% in water) (4.0 g), deionised water (900 g) and blue dye of Example 1 (1.0 g) are stirred at 300 rpm under an atmosphere of nitrogen in a 2 liter 3-neck flask at 70° C. Initiator 2,2'-azobis(2-methylpropionamidine) dihydrochloride (1.0 g) is added. After 20 hours the blue latex is allowed to cool to room temperature, and is filtered through a 5 micron cloth.

Analysis using a Malvern Zetasizer shows a highly disperse latex with a particle size of 420 nm and zeta potential of +63 mV.

The suspension is freeze dried to give a fine blue powder (2).

The following method is used to determine whether dye is leaching from particles:

A known quantity of the freeze dried particles is weighed into a fixed volume of dodecane and redispersed. The dispersion is centrifuged for 5 minutes at 1000 rpm. The supernatant is removed, filtered through a 0.1 micron PTFE (polytetrafluoroethylene) syringe filter. The remaining particles are added to a further fixed volume of dodecane. The above experimental is repeated as many times as required to determine whether dye is leaching from the particles.

The supernatant appears clear and colourless. No dye is leaching into dodecane.

In addition the supernatants are analysed by ultra-violet/visible spectrophometric analysis over a suitable range (typically 350-700 nm) to determine if dye leaching is occurring. No dye is detected.

Example 3

Preparation of Blue Polymethyl Methacrylate (PMMA) Particles Containing Methacrylate Derived from Basic Blue 41

Methyl methacrylate (7.13 g), ethylene glycol dimethacrylate (0.06 g), [2-(methacryloyloxy)ethyl]-trimethyl ammonium chloride solution (75% in water) (0.3 g), water (95.0 g) and blue dye of Example 1 (7.13 mg) are stirred at 400 rpm under an atmosphere of nitrogen in a 250 ml 3-neck flask at 70° C. Initiator 2,2'-azobis(2-methylpropionamidine) dihydrochloride (0.08 g) is added. After 20 hours the blue latex is allowed to cool to room temperature, and is filtered through a 5 micron cloth.

Analysis using a Malvern Zetasizer shows a highly disperse latex with a particle size of 248 nm and zeta potential of +70 mV.

The suspension is freeze dried to give a fine blue powder (3).

The above method is used to determine whether any dye is leaching from the particles. No leaching can be detected. The supernatants are colourless.

Example 4

Preparation of Blue Polymethyl Methacrylate (PMMA) Particles Containing Methacrylate Derived from Basic Blue 41

Methyl methacrylate (7.13 g), ethylene glycol dimethacrylate (0.06 g), [2-(methacryloyloxy)ethyl]-trimethyl ammonium chloride solution (75% in water) (0.3 g), water (95.0 g) and blue dye of Example 1 (17.8 mg) are stirred at 400 rpm under an atmosphere of nitrogen in a 250 ml 3-neck flask at 70° C. Initiator 2,2'-azobis(2-methylpropionamidine) dihydrochloride (0.08 g) is added. After 20 hours the blue latex is allowed to cool to room temperature, and is filtered through a 5 micron cloth.

Analysis using a Malvern Zetasizer shows a highly disperse latex with a particle size of 337 nm and zeta potential of +51 mV.

The suspension is freeze dried to give a fine blue powder (4).

The above method is used to determine whether any dye is leaching from the particles. No leaching can be detected. The supernatants are colourless.

Example 5

Preparation of Blue Polymethyl Methacrylate (PMMA) Particles Containing Methacrylate Derived from Basic Blue 41

Methyl methacrylate (7.13 g), ethylene glycol dimethacrylate (0.06 g), [2-(methacryloyloxy)ethyl]-trimethyl ammonium chloride solution (75% in water) (0.3 g), water (95.0 g) and blue dye of Example 1 (35.6 mg) are stirred at 400 rpm under an atmosphere of nitrogen in a 250 ml 3-neck flask at 70° C. Initiator 2,2'-azobis(2-methylpropionamidine) dihydrochloride (0.08 g) is added. After 20 hours the blue latex is allowed to cool to room temperature, and is filtered through a 5 micron cloth.

Analysis using a Malvern Zetasizer shows a highly disperse latex with a particle size of 290 nm and zeta potential of +66 mV.

The suspension is freeze dried to give a fine blue powder (5).

The above method is used to determine whether any dye is leaching from the particles. No leaching can be detected. The supernatants are colourless.

Example 6

Preparation of Blue Polymethyl Methacrylate (PMMA) Particles Containing Methacrylate Derived from Basic Blue 41

Methyl methacrylate (7.13 g), ethylene glycol dimethacrylate (0.06 g, [2-(methacryloyloxy)ethyl]-trimethyl ammonium methyl sulphate solution (MOTAMS in water (80%) (0.15 g), water (95.0 g) and blue dye of Example 1 (35.7 mg) are stirred at 400 rpm under an atmosphere of nitrogen in a 250 ml 3-neck flask at 70° C. Initiator 2,2'-azobis(2-methylpropionamidine) dihydrochloride (0.08 g) is added. After 20 hours the blue latex is allowed to cool to room temperature, and is filtered through a 5 micron cloth.

Analysis using a Malvern Zetasizer shows a highly disperse latex with a particle size of 194 nm and zeta potential of +55 mV.

The suspension is freeze dried to give a fine blue powder (6).

The above method is used to determine whether any dye is leaching from the particles. No leaching can be detected. The supernatants are colourless.

Example 7

Preparation of Blue Polymethyl Methacrylate (PMMA) Particles Containing Methacrylate Derived from Basic Blue 41

Methyl methacrylate (7.13 g), ethylene glycol dimethacrylate (0.06 g), [2-(methacryloyloxy)ethyl]-trimethyl ammonium chloride solution (75% in water) (0.3 g) and water (95.0 g) are stirred at 400 rpm under an atmosphere of nitrogen in a 250 ml 3-neck flask at 70° C. Initiator 2,2'-azobis(2-methylpropionamidine)dihydrochloride (0.08 g) is added. Blue dye of Example 1 (35.6 mg) is added after initiation. After 20 hours the blue latex is allowed to cool to room temperature, and is filtered through a 5 micron cloth.

Analysis using a Malvern Zetasizer shows a highly disperse latex with a particle size of 183 nm and zeta potential of +69 mV.

The suspension is freeze dried to give a fine blue powder (7).

The above method is used to determine whether any dye is leaching from the particles. No leaching can be detected. The supernatants are colourless.

Example 8

Preparation of Blue Polymethyl Methacrylate (PMMA) Particles Containing Methacrylate Derived from Basic Blue 41

Methyl methacrylate (7.13 g), ethylene glycol dimethacrylate (0.06 g), [2-(methacryloyloxy)ethyl]-trimethyl ammonium chloride solution (75% in water) (0.15 g), water (95.0 g) and blue dye of Example 1 (70.13 mg) are stirred at 400 rpm under an atmosphere of nitrogen in a 250 ml 3-neck flask at 70° C. Initiator 2,2'-azobis(2-methylpropionamidine) dihydrochloride (0.08 g) is added. After 20 hours the blue latex is allowed to cool to room temperature, and is filtered through a 5 micron cloth.

Analysis using a Malvern Zetasizer shows a highly disperse latex with a particle size of 235 nm and zeta potential of +54 mV.

The suspension is freeze dried to give a fine blue powder (8).

The above method is used to determine whether any dye is leaching from the particles. No leaching can be detected. The supernatants are colourless.

Example 9

Preparation of Polymethyl Methacrylate (PMMA) Particles Using Disperse Red 1 Methacrylate Methyl methacrylate (95.0 g), ethylene glycol dimethacrylate (8.0 g), [2-(methacryloyloxy)ethyl]-trimethyl ammonium chloride solution (75% in water) (4.0 g) and disperse red 1 methacrylate dye (Sigma-Aldrich) (250 mg) are stirred at 300 rpm under an atmosphere of nitrogen in a 2 litre 3-neck flask at 70° C. Initiator 2,2'-azobis(2-methylpropionamidine) dihydrochloride (1.0 g) is added. After 20 hours a pink latex is allowed to cool to room temperature, and is filtered through a 5 micron cloth. Analysis using a Malvern Zetasizer shows a highly disperse latex with a particle size of 302 nm and zeta potential of +56 mV. The suspension is freeze dried to give a fine pink powder (9).

The above method is used to determine whether any dye is leaching from the particles. No leaching can be detected. The supernatants are colourless.

Example 10

Electrophoretic Formulation Containing PMMA Incorporating Methacrylate of Basic Blue 41

0.2091 g of coloured PMMA of Example 2 is added to 0.0214 g of OLOA 11000 in 3.0016 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a blue electrophoretic ink.

Size (548 nm), Electrophoretic Mobility (0.03157 μmcm/Vs), ZP (+34 mV).

Example 11

Electrophoretic Formulation Containing PMMA Incorporating Methacrylate of Basic Blue 41 (Example 3)

0.3080 g of coloured PMMA of Example 3 is added to 0.00972 g of detergent Infineum E (Infineum Corporation) in 0.96259 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a blue electrophoretic ink.

Size (234 nm), Electrophoretic Mobility (0.06187 μmcm/Vs), ZP (+67 mV).

Example 12

Electrophoretic Formulation Containing PMMA Incorporating Methacrylate of Basic Blue 41 (Example 4)

0.2980 g of coloured PMMA of Example 4 is added to 0.00968 g of detergent Infineum E (Infineum Corporation) in 0.95942 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a blue electrophoretic ink.

Size (375 nm), Electrophoretic Mobility (0.03241 μmcm/Vs), ZP (+35 mV).

Example 13

Electrophoretic Formulation Containing PMMA Incorporating Methacrylate of Basic Blue 41 (Example 5)

0.3040 g of coloured PMMA of Example 5 is added to 0.00970 g of detergent Infineum E (Infineum Corporation) in 0.9610 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a blue electrophoretic ink.

Size (260 nm), Electrophoretic Mobility (0.07089 μmcm/Vs), ZP (+76 mV).

Example 14

Electrophoretic Formulation Containing PMMA Incorporating Methacrylate of Basic Blue 41 (Example 7)

0.03070 g of coloured PMMA of Example 7 is added to 0.00989 g of detergent Infineum E (Infineum Corporation) in 0.98011 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a blue electrophoretic ink.

Size (176 nm), Electrophoretic Mobility (0.06321 μmcm/Vs), ZP (+68 mV).

Example 15

Electrophoretic Formulation Containing PMMA Incorporating Disperse Red 1 Methacrylate 2.014 g of coloured PMMA of Example 9 is added to 0.216 g of OLOA 11000 and 0.201 g of Ircosperse 2153 in 10.942 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a pink electrophoretic ink.

Size (264 nm), Electrophoretic Mobility (0.04257 μmcm/Vs), ZP (+51 mV).

Example 16

Preparation of 5-(4-chloro-2-nitrophenylazo)-3-cyano-6-hydroxy-1-(2-acryloyloxyethyl)-4-methylpyrid-2-one

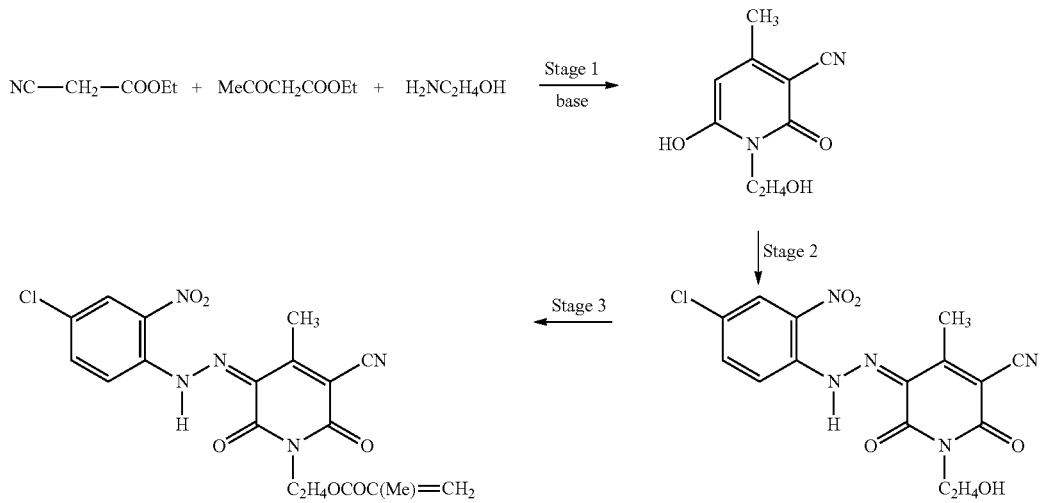

Stage 1

Ethyl cyanacetate (28.28 g, 0.25 mol), ethyl acetoacetate (32.5 g, 0.25 mol), ethanolamine 15.27 g, 0.25 mol) and piperidine (98.6 g, 0.1 mol) in methanol (30 ml), are stirred under reflux for 8 hours, with further ethanolamine (30 ml) being added after 5 hours. The cooled mixture is poured onto ice/water/concentrated hydrochloric acid and stirred overnight at room temperature. A colourless solid (11.2 g, 23% yield) is collected, washed with cold water and dried. mp 173-175° C.

Stage 2

Sodium nitrite solution (2N, 28.5 ml) is added to a cold stirred mixture of 4-chloro-2-nitroaniline (9.77 g, 0.0566 mol) in acetic acid/12N hydrochloric acid (75/25). After 2 hours. the resulting solution of diazonium salt is added to a solution of the above pyridone (11.0 g., 0.0566 mol) in water (prepared by dropwise addition of 2N sodium hydroxide to an aqueous suspension of the coupling component). The cold mixture is stirred for 2 hr without pH adjustment; the resulting yellow solid is collected, slurried with 80% aqueous acetone and dried to give reddish yellow crystals (19.8 g, 92% yield), mp>200° C.

Stage 3

Disperse Dye, 5-(4-chloro-2-nitrophenylazo)-3-cyano-6-hydroxy-1-(2-acryloyloxyethyl)-4-methylpyrid-2-one Methacryloyl anhydride (17.9 g, 0.116 mol) is added to a stirred mixture of 5-(4-chloro-2-nitrophenylazo)-3-cyano-6-hydroxy-1-(2-hydroxyethyl)-4-methylpyrid-2-one (22 g, 058 mol) and pyridine (25 ml) in methylene chloride (200 ml). The mixture is stirred under reflux for 24 hours, forming a solution after ca. 5 hr. After cooling to 20° C. water (20 ml) is added, with stirring, followed by more water (200 ml) after a further 2 hours. The organic layer is collected and the solvent removed to leave a tarry residue which is stirred at 70° C. for 20 minutes, with aqueous methylated spirits. The resulting brownish yellow solid is collected (21.3 g, 82%). This crude product is passed through silica gel using (methylene chloride:hexane 80:20) as eluant. The solvent is removed and the residue is crystallised from methylene chloride/isopropanol.
Yield 14.9 g, 57%, mp 189-190° C.
A second batch on half this scale furnished 8 g. (61%) of product, mp 189-190° C.

The two lots of material were combined and re-crystallised from methylene chloride/isopropanol to yield orange crystals (22 g., 56%), mp 190-191° C.

Example 17

Preparation of Yellow Polystyrene (PS) Particles Containing Disperse Dye of Example 16 by Mini-Emulsion Polymerisation Styrene (5.0 g), divinyl benzene (0.5 g), hexadecane (0.1 g), polyethyleneglycol methyl ether methacrylate (mw 475) (1.0 g), sodium dodecyl sulphate (100 mg), initiator Vazo 67 (2,2'-Azobis(2-methylbutyronitrile) (126 mg) and yellow dye of Example 16 (50 mg) are shaken until soluble and then deionised water (50 g) is added. A magnetic stirrer bar is added. The mixture is evacuated and purged with nitrogen three times using a low power ultrasonic bath on a stirrer hotplate. The stirrer bar is removed. The flask is put into an ice bath and the tip of a sonic probe (Branson 450) is inserted into the mixture. A nitrogen flow is maintained over the mixture.

The mixture is sonicated for 3 minutes at 150 Watts, under an atmosphere of nitrogen. A stable yellow emulsion is formed.

The flask is transferred to a hot oil bath, pre-heated to 75° C., a magnetic stirrer bar is added the flask and the contents are stirred on a stirrer hot plate/oil bath over night.

The mixture is allowed to cool to room temperature and is filtered through a 5 micron cloth. The latex is cleaned with water and acetone to remove any unreacted monomers using a centrifuge to separate particles and supernatant. Analysis using a Malvern Zetasizer shows a highly disperse latex with a particle size of 206 nm. The suspension is freeze dried to give a fine yellow powder (17).

Example 18

Preparation of Yellow Polystyrene (PS) Particles Containing Disperse Dye of Example 16 by Mini-Emulsion Polymerisation Styrene (5.0 g), divinyl benzene (0.5 g), hexadecane (0.1 g), polyethyleneglycol methyl ether methacrylate mw 475 (1.0 g), [2-(methacryloyloxy)ethyl]-trimethyl ammonium chloride solution (75% in water) (100 mg), sodium dodecyl sulphate (100 mg), initiator Vazo 67 (2,2'-Azobis(2-methylbutyronitrile) (126 mg) and yellow pyridine methacrylate dye of Example 16 (50 mg) are shaken until soluble and then deionised water (50 g) is added. A magnetic stirrer bar is added. The mixture is evacuated and purged with nitrogen three times using a low power ultrasonic bath on a stirrer hotplate. The stirrer bar is removed. The flask is put into an ice bath and the tip of a sonic probe (Branson 450) is inserted into the mixture. A nitrogen flow is maintained over the mixture.

The mixture is sonicated for 3 minutes at 150 Watts, under an atmosphere of nitrogen. A stable yellow emulsion is formed.

The flask is transferred to a hot oil bath, pre-heated to 75° C., a magnetic stirrer bar is added the flask and the contents are stirred on a stirrer hot plate/oil bath over night.

The mixture is allowed to cool to room temperature and is filtered through a 5 micron cloth. The latex is cleaned with water and acetone to remove any unreacted monomers using a centrifuge to separate particles and supernatant. Analysis using a Malvern Zetasizer shows a highly disperse latex with a particle size of 205 nm and zeta potential of +63 mV. The suspension is freeze dried to give a fine yellow powder (18).

Example 19

Preparation of Yellow Polystyrene (PS) Particles Containing Disperse Dye of Example 16 by Mini-Emulsion Polymerisation Styrene (5.0 g), divinyl benzene (0.5 g), hexadecane (0.1 g), polyethyleneglycol methyl ether methacrylate mw 475 (1.0 g), [2-(methacryloyloxy)ethyl]-trimethyl ammonium chloride solution (75% in water) (0.5 g), cetyl trimethyl ammonium bromide (100 mg), initiator Vazo 67 (2,2'-Azobis(2-methylbutyronitrile) (126 mg) and yellow pyridine methacrylate dye of Example 16 (50 mg) are shaken until soluble and then deionised water (50 g) is added. A magnetic stirrer bar is added. The mixture is evacuated and purged with nitrogen three times using a low power ultrasonic bath on a stirrer hotplate. The stirrer bar is removed. The flask is put into an ice bath and the tip of a sonic probe (Branson 450) is inserted into the mixture. A nitrogen flow is maintained over the mixture.

The mixture is sonicated for 3 minutes at 150 Watts, under an atmosphere of nitrogen. A stable yellow emulsion is formed.

The flask is transferred to a hot oil bath, pre-heated to 75° C., a magnetic stirrer bar is added the flask and the contents are stirred on a stirrer hot plate/oil bath over night.

The mixture is allowed to cool to room temperature and is filtered through a 5 micron cloth. The latex is cleaned with water and acetone to remove any unreacted monomers using a centrifuge to separate particles and supernatant. Analysis using a Malvern Zetasizer shows a highly disperse latex with a particle size of 169 nm. The suspension is freeze dried to give a fine yellow powder (19).

Example 20

Preparation of Yellow Polystyrene (PS) Particles Containing Disperse Dye of Example 16 by Mini-Emulsion Polymerisation Styrene (5.0 g), divinyl benzene (0.5 g), hexadecane (0.1 g), polyethyleneglycol methyl ether methacrylate mw 475 (1.0 g),), vinylbenzyl trimethyl ammonium chloride solution (250 mg), cetyl trimethyl ammonium bromide (100 mg), initiator Vazo 67 (2,2'-Azobis(2-methylbutyronitrile) (126 mg) and yellow pyridine methacrylate dye of Example 16 (50 mg) are shaken until soluble and then deionised water (50 g) is added. A magnetic stirrer bar is added. The mixture is evacuated and purged with nitrogen three times using a low power ultrasonic bath on a stirrer hotplate. The stirrer bar is removed. The flask is put into an ice bath and the tip of a sonic probe (Branson 450) is inserted into the mixture. A nitrogen flow is maintained over the mixture.

The mixture is sonicated for 3 minutes at 150 Watts, under an atmosphere of nitrogen. A stable yellow emulsion is formed.

The flask is transferred to a hot oil bath, pre-heated to 75° C., a magnetic stirrer bar is added the flask and the contents are stirred on a stirrer hot plate/oil bath over night.

The mixture is allowed to cool to room temperature and is filtered through a micron cloth. The latex is cleaned with water and acetone to remove any unreacted monomers using a centrifuge to separate particles and supernatant. Analysis using a Malvern Zetasizer shows a highly disperse latex with a particle size of 173 nm. The suspension is freeze dried to give a fine yellow powder (20).

Example 21

Preparation of Yellow Polystyrene (PS) Particles Containing Disperse Dye of Example 16 by Mini-Emulsion Polymerisation Styrene (5.0 g), divinyl benzene (0.5 g), hexadecane (0.1 g), polyethyleneglycol methyl ether methacrylate mw 475 (1.0 g), vinylbenzyl trimethyl ammonium chloride solution (500 mg), cetyl trimethyl ammonium bromide (50 mg), initiator Vazo 67 (2,2'-Azobis(2-methylbutyronitrile) (60 mg) and yellow pyridine methacrylate dye of Example 16 (75 mg) are shaken until soluble and then deionised water (50 g) is added. A magnetic stirrer bar is added. The mixture is evacuated and purged with nitrogen three times using a low power ultrasonic bath on a stirrer hotplate. The stirrer bar is removed. The flask is put into an ice bath and the tip of a sonic probe (Branson 450) is inserted into the mixture. A nitrogen flow is maintained over the mixture.

The mixture is sonicated for 3 minutes at 150 Watts, under an atmosphere of nitrogen. A stable yellow emulsion is formed.

The flask is transferred to a hot oil bath, pre-heated to 75° C., a magnetic stirrer bar is added the flask and the contents are stirred on a stirrer hot plate/oil bath over night.

The mixture is allowed to cool to room temperature and is filtered through a 5 micron cloth. The latex is cleaned with water and acetone to remove any unreacted monomers using a centrifuge to separate particles and supernatant. Analysis using a Malvern Zetasizer shows a highly disperse latex with a particle size of 180 nm. The suspension is freeze dried to give a fine yellow powder (21).

Example 22

Preparation of Cationic Co-Monomer for Use in Particles of Example 23

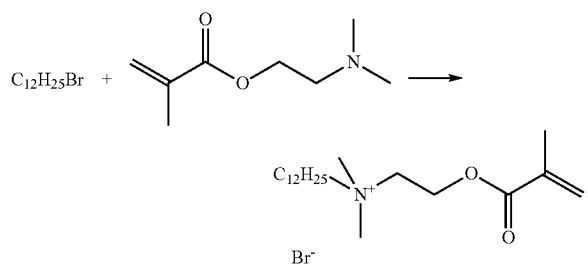

1-Bromododecane (12.6 g, 50.56 mmol), dimethylaminoethyl methacrylate (17.7 g, 112.6 mmol) are stirred in acetone (100 ml) for 20 hours at 35° C. The acetone is removed under reduced pressure on a rotary evaporator. Petrol is added to precipitate crystals. The crystals are removed by filtration to give a white crystalline solid (13.6 g, 66%).

Example 23

Preparation of Yellow Polystyrene (PS) Particles Containing Disperse Dye of Example 16 by Mini-Emulsion Polymerisation Methyl methacrylate (5.0 g), ethylene glycol dimethacrylate (0.5 g), hexadecane (0.1 g), polyethyleneglycol methyl ether methacrylate mw 2080 (50 wt % in water) (2.0 g), initiator Vazo 67 (2,2'-Azobis(2-methylbutyronitrile) (100 mg) and yellow pyridine methacrylate dye of Example 16 (50 mg) and co-monomer of Example 22 (100 mg) are shaken until soluble and then deionised water (50 g) is added. A magnetic stirrer bar is added. The mixture is evacuated and purged with nitrogen three times using a low power ultrasonic bath on a stirrer hotplate. The stirrer bar is removed. The flask is put into an ice bath and the tip of a sonic probe (Branson 450) is inserted into the mixture. A nitrogen flow is maintained over the mixture.

The mixture is sonicated for 3 minutes at 150 Watts, under an atmosphere of nitrogen. A stable yellow emulsion is formed.

The flask is transferred to a hot oil bath, pre-heated to 75° C., a magnetic stirrer bar is added the flask and the contents are stirred on a stirrer hot plate/oil bath over night.

The mixture is allowed to cool to room temperature and is filtered through a 5 micron cloth. The latex is cleaned with water and acetone to remove any unreacted monomers using a centrifuge to separate particles and supernatant. Analysis using a Malvern Zetasizer shows a highly disperse latex with a particle size of 236 nm. The suspension is freeze dried to give a fine yellow powder (23).

Example 24

Electrophoretic Formulation Containing PS Incorporating Yellow Dye 0.02990 g of coloured PS of Example 17 is added to 0.00966 g of detergent Infineum E (Infineum Corporation) in 0.95665 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a yellow electrophoretic ink.

Size (300 nm), Electrophoretic Mobility (0.1058 μmcm/Vs), ZP (+114 mV).

Example 25

Electrophoretic Formulation Containing PS Incorporating Yellow Dye 0.01320 g of coloured PS of Example 18 is added to 0.00481 g of detergent Infineum E (Infineum Corporation) in 0.47689 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a yellow electrophoretic ink.

Size (312 nm), Electrophoretic Mobility (0.07511 μmcm/Vs), ZP (+81 mV).

Example 26

Electrophoretic Formulation Containing PS Incorporating Yellow Dye 0.03040 g of coloured PS of Example 19 is added to 0.00967 g of detergent Infineum E (Infineum Corporation) in 0.95852 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a yellow electrophoretic ink.

Size (216 nm), Electrophoretic Mobility (0.07435 μmcm/Vs), ZP (+80 mV).

Example 27

Electrophoretic Formulation Containing PS Incorporating Yellow Dye 0.03040 g of coloured PS of Example 20 is added to 0.00966 g of detergent Infineum E (Infineum Corporation) in 0.95704 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a yellow electrophoretic ink.

Size (278 nm), Electrophoretic Mobility (0.08249 μmcm/Vs), ZP (+89 mV).

Example 28

Electrophoretic Formulation Containing PS Incorporating Yellow Dye 0.01520 g of coloured PS of Example 21 is added to 0.00541 g of detergent Infineum E (Infineum Corporation) in 0.53579 g of dodecane and vortex mixed. The resultant dispersion is then homogenised using an ultra-turrax T25 homogeniser for 15 minutes and sonicated for a further 30 minutes in an Ultrawave ultrasonic bath. The dispersion is then roller mixed overnight to yield a yellow electrophoretic ink.

Size (470 nm), Electrophoretic Mobility (0.06134 μmcm/Vs), ZP (+66 mV).

The invention claimed is:

1. An electrophoretic fluid comprising colored polymer particles, which comprise monomer units of at least one polymerizable dye, at least one monomer, optionally at least one charged co-monomer, and optionally at least one crosslinking co-monomer, wherein the polymerizable dye is a dye of Formula 2 or a dye of formula 3

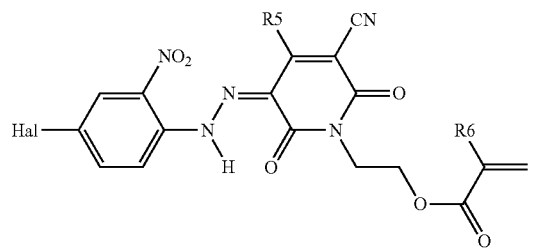

Formula 2

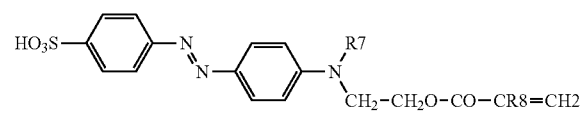

Formula 3 wherein
R5, R7=alkyl,
R6, R8=H or $CH_3$, and
Hal=halogen.

2. An electrophoretic fluid according to claim 1, wherein the colored polymer particles have been prepared by a process, which comprises
    a) reacting the at least one polymerizable dye, at least one monomer, at least one initiator, and optionally at least one charged co-monomer, and optionally
    b) washing and drying the colored polymer particles.

3. An electrophoretic fluid according to claim 1, wherein the dye is a water-insoluble dye.

4. An electrophoretic fluid according to claim 1, wherein the dye is a water-soluble dye.

5. An electrophoretic fluid according to claim 1, wherein the polymerizable dye is of Formula 3

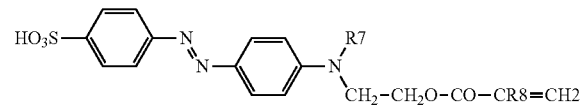

Formula 3 wherein
R7=alkyl, and
R8=H or $CH_3$.

6. An electrophoretic fluid according to claim 1, wherein the polymer particles have been prepared from a composition comprising the polymerizable dye, a monomer, a crosslinker, an ionic co-monomer, and an initiator by surfactant-free emulsion copolymerization in a batch process.

7. An electrophoretic fluid according to claim 1, wherein the colored polymer particles have been prepared by a process, which is a mini-emulsion polymerization.

8. An electrophoretic fluid according to claim 1, wherein the polymer particles have a diameter of 50-1000 nm.

9. An electrophoretic fluid according to claim 1, wherein the colored polymer particles comprise monomer units of the at least one polymerizable dye, at least one monomer, at least one charged co-monomer, and at least one crosslinking co-monomer.

10. A mono, bi or polychromal electrophoretic device, comprising an electrophoretic fluid according to claim 1.

11. An electrophoretic display device comprising an electrophoretic fluid according to claim 1.

12. An electrophoretic fluid according to claim 1, wherein the polymerizable dye is a compound of Formula 2

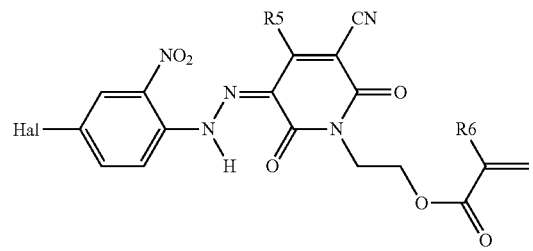

Formula 2 wherein
R5=alkyl,
R6=H or $CH_3$, and
Hal=halogen.

13. An electrophoretic fluid according to claim 1, wherein the polymerizable dye is a compound of Formula 2 in which Hal=Cl, and R5 and R6=$CH_3$.

14. An electrophoretic fluid according to claim 1, wherein the polymer particles have a diameter of 150-600 nm.

15. An electrophoretic fluid according to claim 1, wherein the polymerizable dye is a compound of Formula 3 in which R7=$C_2H_5$ and R8=$CH_3$.

* * * * *